J. J. GILCHRIST.
NUT LOCK.
APPLICATION FILED AUG. 15, 1913.
1,099,743.
Patented June 9, 1914.
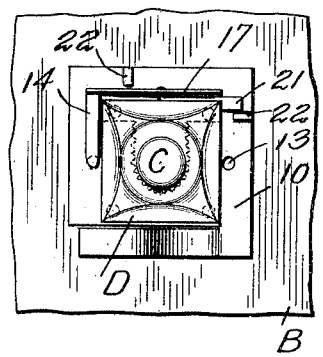
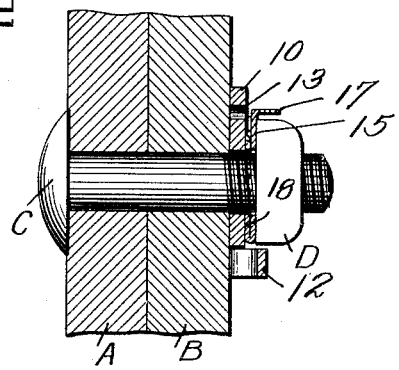
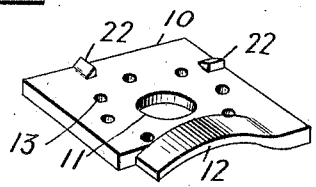
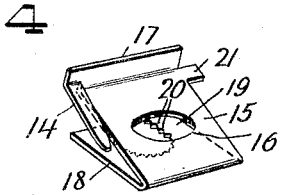
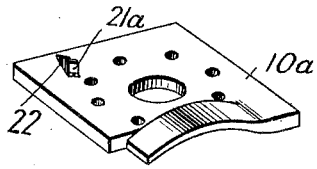
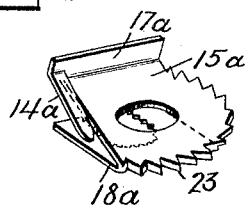
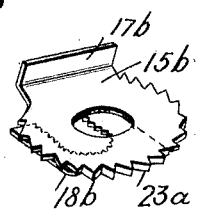
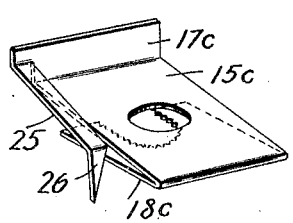
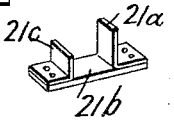
WITNESSES
INVENTOR
JOSEPH J. GILCHRIST
BY
ATTORNEYS

UNITED STATES PATENT OFFICE.

JOSEPH JOHNSON GILCHRIST, OF PITTSBURGH, PENNSYLVANIA.

NUT-LOCK.

1,099,743.   Specification of Letters Patent.   Patented June 9, 1914.

Application filed August 15, 1913. Serial No. 784,881.

*To all whom it may concern:*

Be it known that I, JOSEPH J. GILCHRIST, a citizen of the United States, and a resident of Pittsburgh, in the county of Allegheny and State of Pennsylvania, have invented a new and Improved Nut-Lock, of which the following is a full, clear, and exact description.

The invention is designed for use in railway joints and in other structures requiring the locking of a nut on a bolt.

It is a design of the invention to provide a novel device which may be readily applied to a bolt and nut to effectually lock the nut against accidental loosening.

The invention will be particularly explained in the specific description following.

Reference is to be had to the accompanying drawings forming a part of this specification, in which similar characters of reference indicate corresponding parts in all the views, and in which—

Figure 1 is a front view of a nut lock embodying my invention, showing the same applied to a railway joint; Fig. 2 is a vertical longitudinal section; Fig. 3 is a perspective view of a novel washer forming a part of the device; Fig. 4 is a perspective view of the locking device employed in connection with the washer; Fig. 5 is a perspective view showing a modified form of the washer; Figs. 6 and 7 are perspective views of different forms of the locking device; Fig. 8 is a perspective view of a further modification of the washer; and Fig. 9 is a perspective view of a detail forming part of the washer shown in Fig. 5.

The invention in the present instance is shown in connection with members A and B of a railway joint, a bolt C and a nut D. The improved device includes a washer 10 having a bolt hole 11. The said washer is slitted approximately parallel with one edge forming a side arm 12 which is arched and resilient, the said arm being adapted to square with and engage a side of the nut D. An annular series of depressions or holes 13 are formed around the bolt hole of the washer, the depressions being adapted to be engaged by a spring dog 14 formed integrally on a sheet metal locking device 15, the body of which is in the form of a plate. The plate has a bolt hole 16 and along one side edge has a perpendicular flange 17 to engage a side of the nut D, as shown in Fig. 2. At the under side the plate is returned in the form of a spring flange 18 which is normally at an acute angle to the plate and is forked as at 19. The inner walls of the fork 19 at the sides and base are formed as teeth 20. There is furthermore formed on the plate at one side a laterally projecting tongue 21 which is adapted to be engaged with one of two or more shouldered lugs 22 on the washer 10, the said shoulders being formed with an inclined front surface and a perpendicular rear side or shoulder.

With the described construction the washer 10 is placed over the bolt C and the locking device and nut then placed on to the bolt outside of the washer, the nut and locking device turning together. Upon screwing the nut home the spring flange 18 will yield to the pressure, the nut finally compressing the locking device between the inner face of the nut and the washer. The teeth 20 will thus be pressed into the threads of the bolt and will assist in preventing the accidental unloosening of the parts but will not resist turning of the nut by a wrench. It is designed that the spring arm 12 of the washer will square with a side of the nut, as in Fig. 2, when the nut is screwed tight and that the spring dog 14 will engage in one of the depressions 13. However, the locations of the shouldered lugs 22 are such that the spring tongue 21 of the locking device will be adjacent to one of said lugs when the dog 14 is between two adjacent depressions 13 and the nut is angularly disposed with respect to the spring arm 12, so that if the dog and spring arm are not in positions to engage the nut the spring tongue 21 may be made to engage a lug 22.

In the form shown in Fig. 5 the lugs 22 of the washer are omitted, there being a spring tongue 21ª disposed approximately perpendicular, said tongue being formed on a separate plate 21ᵇ which also has at the end opposite the tongue 21ª a tongue or projection 21ᶜ, the two tongues being adapted to project upwardly through a slot 22 in the washer. The washer (Fig. 5) is designed to be used with locking device 15ª shown in Fig. 6 or a similar device 15ᵇ shown in Fig. 7. In Fig. 6 the plate 15ª is formed with edge teeth 23 to engage the tongue 21ª. The locking device of Fig. 6 includes the dog 14ª, perpendicular flange 17ª and the returned flange 18ª similar to the corresponding parts in Fig. 4. Likewise the plate 15$^b$ in Fig. 7 has corresponding elements 17$^b$—18$^b$ as well as the teeth 23$^a$ to engage the tongue 21$^a$.

In Fig. 8 a locking device is shown adapted for use on the nuts of bolts in structures formed of wood. The plate may have flange 17$^c$ to engage the nut and the returned forked flange 18$^c$ similar to the corresponding elements in the other form of locking device, and there is formed a spring arm 25 at one side of the plate, the free end 26 of which is in the form of a spur to be driven into the wood when the nut is screwed home.

Having thus described my invention, what I claim as new and desire to secure by Letters Patent is:—

1. A nut lock comprising a washer having a resilient member to engage a side of a nut, and a locking plate having a bolt hole, a side flange to engage a side of a nut, and a resilient forked flange at an acute angle to the plate at the under side thereof to straddle a bolt, the fork presenting toothed inner edges to engage a bolt thread, there being co-acting locking elements on the washer and locking plate to engage each other.

2. A nut lock comprising a washer having a resilient arm along a side thereof to engage a side of the nut, and an annular series of depressions around the bolt hole of the washer; and a locking plate having a bolt hole, a flange to engage a side of a nut and a resilient dog to engage in the depressions of the washer, there being co-acting elements on the washer and locking plate to engage each other when the dog is in an intermediate position between adjacent depressions and the resilient arm of the washer is not square with the side of the nut.

In testimony whereof I have signed my name to this specification in the presence of two subscribing witnesses.

JOSEPH JOHNSON GILCHRIST.

Witnesses:
L. H. McCabe,
Samuel Hazlett.

---

Copies of this patent may be obtained for five cents each, by addressing the "Commissioner of Patents, Washington, D. C."